United States Patent
Uchiyama (10) Patent No.: US 7,308,548 B2
(45) Date of Patent: Dec. 11, 2007

(54) PROCESSOR ORGANIZING APPARATUS AND METHOD FOR ORGANIZE A PIPELINE PROCESSOR

(75) Inventor: Masato Uchiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 286 days.

(21) Appl. No.: 11/002,186

(22) Filed: Dec. 3, 2004

(65) Prior Publication Data
US 2005/0166027 A1    Jul. 28, 2005

(30) Foreign Application Priority Data
Jan. 9, 2004    (JP)    ............ P2004-004590

(51) Int. Cl.
*G06F 12/00*    (2006.01)
(52) U.S. Cl. ............ 711/169; 712/220
(58) Field of Classification Search .......... 711/169
See application file for complete search history.

(56) References Cited

U.S. PATENT DOCUMENTS

| | | | | |
|---|---|---|---|---|
| 6,205,536 | B1 * | 3/2001 | Yoshida | 712/38 |
| 6,707,754 | B2 * | 3/2004 | Kirsch | 365/230.06 |
| 6,973,417 | B1 * | 12/2005 | Maxwell et al. | 703/2 |
| 2002/0147957 | A1 | 10/2002 | Matsui et al. | |

* cited by examiner

*Primary Examiner*—Brian R. Peugh
*Assistant Examiner*—Hashem Farrokh
(74) *Attorney, Agent, or Firm*—Oblon, Spivak, McClelland, Maier & Neustadt, P.C.

(57) ABSTRACT

An apparatus for organizing a processor includes a execution cycle calculator calculating an execution cycle time of a pipeline processor, an access time calculator calculating a memory access time of an internal memory contained in the pipeline processor, and a configuration storage unit storing a memory access time of the internal memory reset in integer value times of the execution cycle time, when the memory access time is longer than the execution cycle time.

16 Claims, 8 Drawing Sheets

PROCESSOR ORGANIZING APPARATUS AND METHOD FOR ORGANIZE A PIPELINE PROCESSOR

CROSS REFERENCE TO RELATED APPLICATIONS

This application is based upon and claims the benefit of priority from prior Japanese Patent Application P2004-004590 filed on Jan. 9, 2004; the entire contents of which are incorporated by reference herein.

BACKGROUND OF THE INVENTION

1. Field of the Invention

The invention relates to a processor organizing apparatus and method, particularly to a processor organizing apparatus that organizes a pipeline processor.

2. Description of the Related Art

A system LSI organizing apparatus includes a processor organizing apparatus having a system LSI organizing environment generating unit. The system LSI organizing environment generating unit stores a plurality of software components that operate on a computer system, used for organizing and designing a system LSI. In addition, the software components operate in accordance with variable item definition information associated with the organization and design of the system LSI, and the system LSI organizing environment generating unit generates a hardware description, a verification environment and a organization and design tool for the system LSI. The variable item definition information contains at least one of option instruction information, user-defined module information, and multiprocessor configuration information.

When an internal memory is incorporated in the system LSI by the processor organizing apparatus, effectiveness in processing speed of an application, which executes instructions using data stored in the internal memory, improves. Then, it is desirable for capacity of the internal memory to be large.

However, when the capacity of the internal memory increases, memory access time increases due to an increase in the number of address bits. Therefore, memory access movement is not finished within a pipeline stage cycle time of a pipeline processor. As a result, correct data is not provided at the pipeline stage after a memory access stage. Therefore correct movement of the pipeline processor is not assured.

When cycle time of a processor is increased in order to solve this problem, throughput of the pipeline processing falls, and a performance of the pipeline processor deteriorates. On the other hand, a re-design of the pipeline control circuit causes increase of a cost and prolonging of organization.

SUMMARY OF THE INVENTION

An aspect of the present invention inheres in an apparatus for organizing a processor including an execution cycle calculator configured to calculate an execution cycle time of a pipeline processor; an access time calculator configured to calculate a memory access time of an internal memory contained in the pipeline processor; and a configuration storage unit configured to store a memory access time of the internal memory reset in integer value times of the execution cycle time, when the memory access time is longer than the execution cycle time.

Another aspect of the present invention inheres in a computer implemented method for organizing a processor, including calculating an execution cycle time of a pipeline processor; calculating a memory access time of an internal memory contained in the pipeline processor; and storing a memory access time of the internal memory reset in integer value times of the execution cycle time in a configuration storage unit, when the memory access time is longer than the execution cycle.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

FIRST EMBODIMENT

Figure 1:
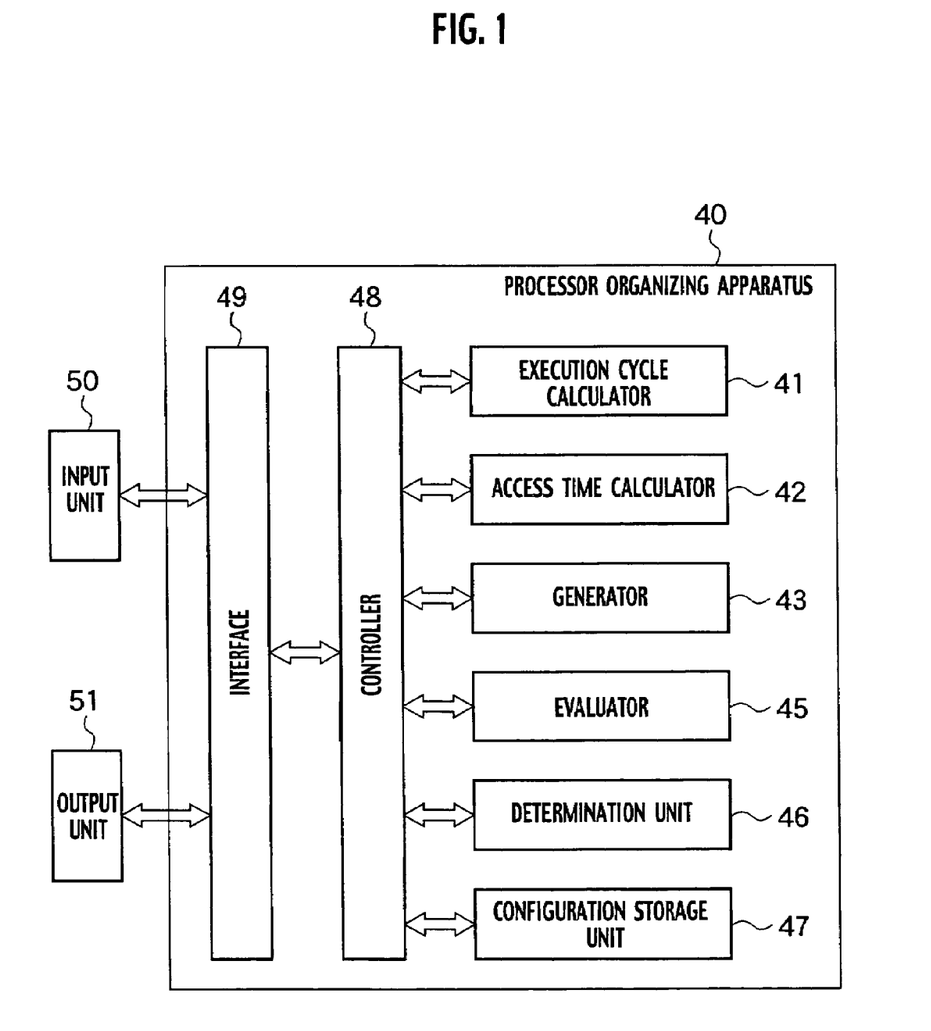
FIG. 1 is a schematic view showing a processor organizing apparatus according to a first embodiment of the invention.

As shown in FIG. 1, a processor organizing apparatus 40 according to a first embodiment of the invention encompasses an execution cycle calculator 41, an access time calculator 42, a generator 43, an evaluator 45, a determination unit 46, a configuration storage unit 47, a controller 48 and an interface 49. The controller 48 is connected to the execution cycle calculator 41, the access time calculator 42, the generator 43, the evaluator 45, the determination unit 46, the configuration storage unit 47 and the interface 49.

The processor organizing apparatus 40 is connected to an input unit 50 and an output unit 51. The apparatus 40 receives various types of information from the input unit 50, and delivers various types of information to the output unit 51. In this instance, a keyboard, a mouse pointer, a numeric keypad, or a touch panel, for example, can be adopted as the input unit 50. A display or a printer, for example, can be adopted as the output unit 51.

The execution cycle calculator 41 calculates the maximum operation time of an arithmetic circuit based on the option instruction of a pipeline processor stored in the configuration storage unit 47. And the execution cycle calculator 41 calculates the execution cycle time of the pipeline processor based on configuration information stored in the configuration storage unit 47. The execution cycle calculator 41 compares the maximum operation time with the execution cycle time of the pipeline processor. The execution cycle calculator 41 selects the shortest cycle time as a reference cycle time from among cycle times that can be adopted as the execution cycle time based on results of comparison.

The access time calculator 42 calculates the memory access time of an internal memory contained in the pipeline processor based on a memory capacity thereof. The access time is calculated based on the memory capacity, because the memory cell select time increases due to an increase in the number of bits or words of the internal memory.

The generator 43 generates a hardware description, a verification environment and a development and design tool for a system LSI, for all possible combinations of configurations. The generator 43 also generates a compiler to compile a C-written application program. When an application program is written in an assembly language, the generator 43 generates an assembler to assemble the program into an object file. The generator 43 generates a simulator to simulate an executable file. The simulator not only can provide results of simulation, but also can count by ones instructions executed during simulation and thus measure the number of executed instructions throughout the application program. The generator 43 also generates a linker and a debugger to correct an executable file.

The generator 43 generates the tool for all possible combinations of configurations. At the completion of generation of the tool, a user puts the application program into execution. After the execution of the application program, the evaluator 45 then reads the results of execution of the application program so as to evaluate the performance of the application program. The evaluator 45 estimates the code size, the number of executed instructions, the number of execution cycles, the chip gate size and power consumption of the application program.

The generator 43 generates the pipeline processor that performs memory access over three execution stages. For example, the generator 43 generates design information of the pipeline processor including a pipeline control circuit and a bypass circuit which operates in a reference clock cycle, and delivers the design information to the output unit 51. The generator 43 also writes the execution stages Pn value "3", that is, the number of pipeline stages of a memory access stage, into the configuration storage unit 47.

The evaluator 45 measures the exact number of cycles throughout the application program by performing measurement of cache errors during the execution of the application program and measurement of the number of cycles of each executed instruction, as well as can evaluate the code size of the application program. The evaluator 45 also measures the number of executed instructions between two specified points in the application program by writing instructions, which indicate the starting point and endpoint of measurement of the number of executed instructions, into the application program.

The evaluator 45 can also measure the number of execution cycles. For example, the evaluator 45 uses the same approach for section definition as in the case of the number of executed instructions. To measure the number of execution cycles of an inside for loop of the program, the evaluator 45 adds "start" and "end" before and after the inside for loop, respectively.

The evaluator 45 receives a register transfer level (RTL) description from the generator 43. By using a commercially available tool, the evaluator 45 extracts power consumption or numeric values that can be converted into power consumption. By utilizing the RTL description, the evaluator 45 also extracts the gate size or numeric values that can be converted into the gate size.

Such extraction of information on the gate size makes it possible to determine the optimum area of the chip, and thus leads to a reduction in the cost of manufacturing the LSI.

Incidentally, the evaluator 45 may extract a cache error rate (or a cache hit ratio) by utilizing the RTL description, the compiler, the simulator, or the verification environment, which is generated by the generator 43.

The determination unit 46 determines whether or not the designed system LSI satisfies user-preset target performance, based on results of performance evaluation performed by the evaluator 45. When the system LSI does not satisfy the target performance, the configuration storage unit 47 derives next and later set values, based on the result of evaluation performed by the evaluator 45. The configuration storage unit 47 can store and derive the option instructions and configuration information of the pipeline processor.

The controller 48 controls the structural components in the processor organizing apparatus 40 in accordance with user's commands via the interface 49.

This description is given with regard to a process for organizing a pipeline processor using the processor organizing apparatus 40.

First, a user enters the maximum configuration for the cache size and performance of an arithmetic unit into the processor organizing apparatus 40. Upon receipt of input of the configuration, the generator 43 in the processor organizing apparatus 40 generates the tool for all possible combinations of configurations. At the completion of generation of the tool, the user puts the application program into execution.

After the execution of the application program, the evaluator 45 then reads the result of execution of the application program so as to evaluate the performance of the application program. At the completion of performance evaluation by the evaluator 45, the determination unit 46 determines whether or not the performance of the initial configuration reaches the target performance.

When the performance reaches the target performance, the determination unit 46 extracts the minimum configuration of the pipeline processor that satisfies the target performance, and delivers the verification environment and document to the output unit 51 via the interface 49 so that the user can check the verification environment and document.

In this case, the document displayed by the output unit 51 contains the description about items to check the specified configuration.

When the performance does not reach the target performance, the user designs a user-defined module, incorporates the user-defined module into the organization tool, and rewrites the application program so that the user-defined module may be utilized.

Then, the user again carries out the application program and determines whether or not the rewritten application program satisfies desired target performance.

In the design of the system LSI using a configurable pipeline processor, the above-mentioned pipeline processor organizing apparatus 40 calculates the memory access time of the internal memory contained in the pipeline processor from the memory size of the internal memory.

On the other hand, the maximum operation time of the arithmetic circuit obtained on the basis of the presence or absence of the option instruction of the pipeline processor is compared with the execution cycle time of the processor obtained on the basis of the configuration information. The execution cycle calculator 41 selects the shortest cycle time as a reference cycle time from among cycle times that can be adopted as the execution cycle time.

Then, the generator 43 generates the design information on the pipeline processor including the pipeline control circuit and the bypass circuit which perform an internal memory access stage at Pn cycles. As employed herein, Pn refers to an integer which is determined by dividing the memory access time by the reference cycle time and raising decimals to the next whole number.

Figure 2:
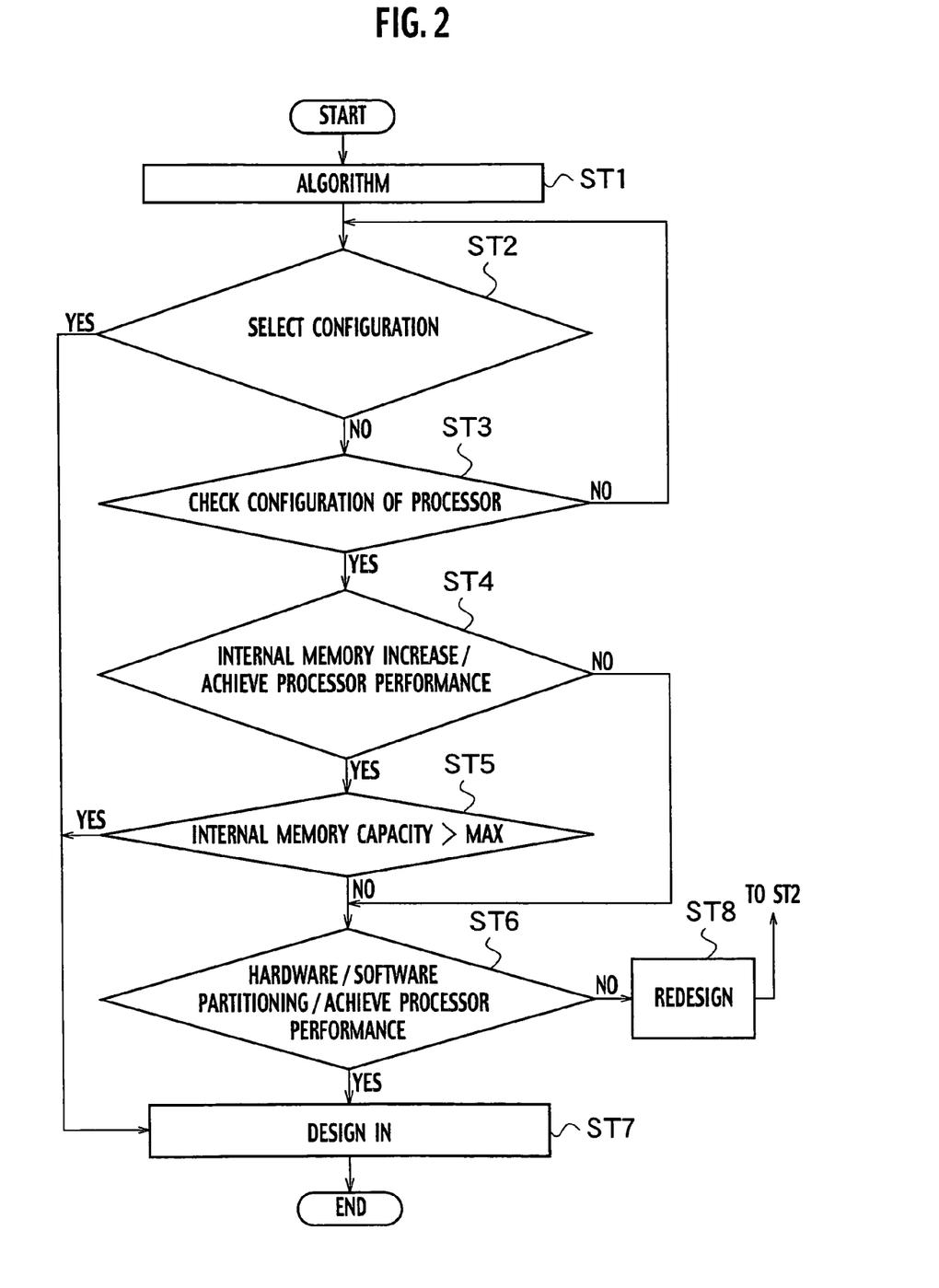
FIG. 2 is a flowchart explaining a method of organizing a pipeline processor according to the first embodiment of the invention.

The description is now given with regard to a method for organizing a pipeline processor according to the first embodiment of the invention with reference to the diagram of FIG. 1 and a flowchart of FIG. 2.

In the step ST1, a user writes an application program in C language, and enters the program through the input unit 50 into the processor organizing apparatus 40, wherein the program is then stored in the configuration storage unit 47 via the interface 49 and the controller 48.

In the step ST2, the design engineer selects the configuration of the pipeline processor through the input unit 50, and operates the generator 43 to generate the design tool such as the compiler or the simulator. The compiler or the simulator generated by the generator 43 is used to check whether or not the pipeline processor reaches desired performance. When the pipeline processor reaches the target performance (Yes in the step ST2), the processing jumps to the step ST7, where software is fine-tuned and a circuit is subjected to high-order composition. If necessary, manual fine-tuned design may be added in the step ST7. When the pipeline processor does not reach the target performance (No in the step ST2), the processing goes to the step ST3.

In the step ST3, the user uses the output unit 51 to check whether or not combinations of selections of pipeline processor configurations to be evaluated are completed, thereby evaluating the performance of the source program having system LSI specifications written in C language. When the combinations are not completed (No in the step ST3), the processing returns to the step ST2, where the configuration of the pipeline processor is changed to other configurations. When the combinations are completed (Yes in the step ST3), the processing goes to the step ST4.

In the step ST4, the generator 43 generates the configuration of the pipeline processor and also generates the design tool such as the compiler or the simulator. When the result of evaluation of the system LSI for all combinations of configurable processors is that the system LSI does not satisfy the desired performance, an increase of internal memory size is considered. In the step ST4, the performance evaluation of a processor Pa is done. The processor Pa has the configuration selected from among combinations of structural components, and the configuration has excellent performance although it does not reach the target performance. For this performance evaluation, the memory capacity exceeding the internal memory capacity, which is prepared for a further improvement in performance, is set. The compiler or the simulator generated by the generator 43 is used to check whether or not the pipeline processor reaches the target performance by accessing the internal memory having the increased capacity. When the pipeline processor reaches the target performance (Yes in the step ST4), the processing goes to the step ST5.

In the step ST5, determination is made as to whether or not the capacity of the internal memory of the pipeline processor reaching the target performance is equal to or more than an upper limit to the capacity of the internal memory that can be accessed in one execution cycle or a plurality of execution cycles. When the performance of the system LSI written as the program reaches the target performance, the calculated size of the internal memory is compared with the memory size determined based on an upper limit to the chip size of the pipeline processor in terms of implementation, and the memory size determined based on an upper limit to the chip size determined from the chip cost of the pipeline processor. When the calculated size of the internal memory is smaller than the upper limits to these memory sizes, the processing goes to the step ST7.

When the calculated size of the internal memory is larger than the upper limits to these memory sizes, the size of the internal memory cannot be adopted, and thus the processing goes to the step ST6.

The use of the processor organizing apparatus 40 is effective, when the result of performance evaluation of the system LSI for combinations of configurable structural components of the pipeline processor, which is performed by the user who designs the system LSI by writing the program in C language, is that the system LSI cannot satisfy the target performance.

For example, the processor organizing apparatus 40 has the following advantage. The processor organizing apparatus 40 can carry out the performance evaluation of the system LSI with accuracy and ease, when the internal memory capacity is increased so that an effective memory access speed is improved, before the start of design using functional partitioning of software and hardware requiring information and knowledge about hardware of a circuit to be implemented in hardware. Thus, the processor organizing apparatus 40 can reduce the time required for design and organization.

When the internal memory capacity is equal to or less than the upper limit (Yes in the step ST5), the processing goes to the step ST7. When the internal memory capacity is more than the upper limit (No in the step ST5), the processing goes to the step ST6. In the step ST6, the user selects a part to be implemented in hardware, constituting the system LSI.

When the pipeline processor does not reach the target performance So in the step ST4), the processing goes to the step ST6.

In the step ST6, the user enters a command to perform functional partitioning of a hardware part and a software part of the system LSI. Upon receipt of the command, the generator 43 generates the compiler and the simulator, and the generator 43 compiles the software program of the system LSI and then simulates the system LSI.

The user can confirm the result of simulation of the system LSI displayed by the output unit 51 in the step ST6, so that the user can determine whether or not the system LSI reaches the target performance. When the system LSI reaches the target performance (Yes in the step ST6), the processing goes to the step ST7. When the system LSI does not reach the target performance (No in the step ST6), the processing goes to the step and then returns to the step ST2.

In the step ST8, the user redesigns the pipeline processor, and also selects an algorithm of the system LSI.

SECOND EMBODIMENT

Figure 3:
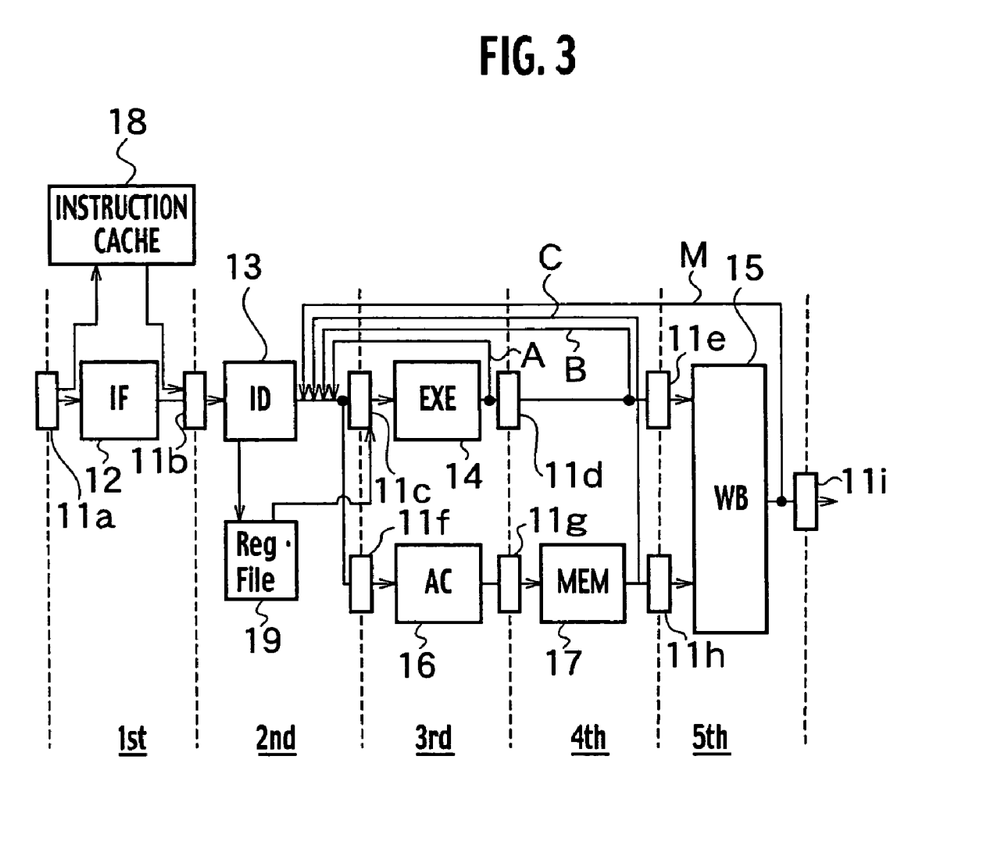
FIG. 3 is a view showing execution stages of a pipeline processor according to a second embodiment of the invention.

FIG. 3 is a diagram showing execution stages of a pipeline processor according to a second embodiment of the invention. The number of the execution stages of the pipeline processor is a total of five stages so that the pipeline configuration executes an instruction.

The execution stages of the pipeline processor are configured so that fetching of an instruction (IF) 12 is carried out in a first stage, decoding of the instruction (ID) 13 is carried out in a second stage, execution of the instruction (EXE) 14 is carried out in a third stage, accessing of the internal memory (MEM) 17 is carried out in a fourth stage, and writing back to a register (WB) 15 is carried out in a fifth stage.

The first stage involves reading the instruction from an instruction cache 18 through register processing 11a. The second stage involves receiving the fetched instruction through register processing 11b, decoding the instruction, reading a register file from a general-purpose register (Reg. File) 19, and retaining the register file through register processing 11c.

As employed herein, the register processing 11a to 11h refer to, for example, a stage which holds the result of operation carried out by an arithmetic logic unit (ALU) constituting the processor in one machine clock time, or a stage which holds data from the instruction cache 18 in one machine clock time. As an alternative to the instruction cache 18, an instruction RAM (random access memory) may be, of course, used to carry out the fetch of an instruction therefore.

The third stage involves executing the instruction in accordance with the result of decoding, and retaining the result of execution through the register processing 11b.

When the instruction is a load instruction or a store instruction, the forth stage involves accessing a data cache memory or a data RAM, reading data from the memory or writing data to the memory, and retaining the result of reading or writing through register processing 11h.

The fifth stage involves receiving the result of instruction execution through register processing 11e, and writing back the result of instruction execution to the general-purpose register through register processing 11i.

When the load instruction or the store instruction is executed, calculating an address (AC) 16 is carried out concurrently with execution 14. AC 16 calculates the address of the memory accessed by the memory access 17.

The stage of calculating the address 16 involves receiving the instruction through register processing 11f, and retaining the result of address calculation through register processing 11g.

The fifth stage also involves receiving the result of memory access through the register processing 11h, and writing back the result of memory access to the general-purpose register through the register processing 11i.

For the following pipeline to execute an instruction, the pipeline configuration comprising the five stages 20 can utilize the result A of instruction execution, the result B of instruction execution which is received through register processing 11d and held in the fourth stage, the result C of access in the stage of the memory access 17, and write back data M.

More specifically, the pipeline configuration has an advantage as given below. The pipeline configuration allows the following pipelining to use the intermediate results (A, B, C, and M) of the third, fourth and fifth stages, and thus fails to cause an increase in pipeline stall (i.e., insertion of NOP (no operation)), as compared to a earlier pipeline processor which requires the processing time for the following pipelining using data outputted by the fifth stage.

To design a system LSI using a configurable processor, the user who is the design engineer selects among combinations of configurable structural components of the pipeline processor and evaluates the selected combination, by using a design environment generating system provided by an LSI maker which manufactures large-scale integrated circuits.

The user checks the result of simulation of the system LSI. When the performance of the system LSI reaches a target performance, the user then carries out the design in (see FIG. 2).

Figure 4:
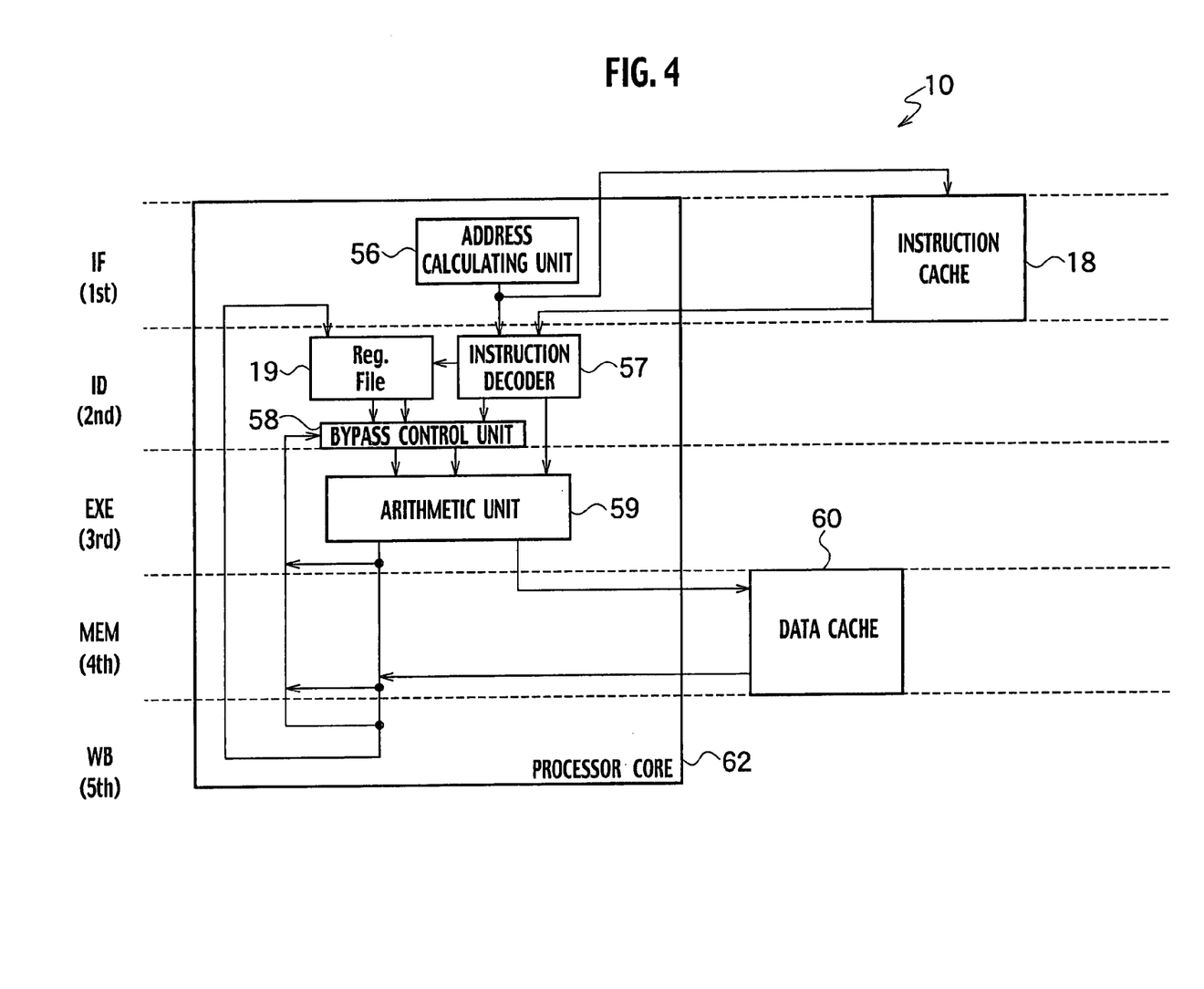
FIG. 4 is a schematic view showing the pipeline processor according to the second embodiment of the invention.

FIG. 4 is a diagram of the pipeline processor according to the second embodiment of the invention. The pipeline processor 10 includes a processor core 62, the instruction cache 18, and a data cache memory 60, which are mounted on a semiconductor substrate. The pipeline processor 10 has the pipeline configuration including a total of five stages so that the pipeline configuration executes an instruction.

Incidentally, it is needless to say that the registers for use in register processing of the stages described with reference to FIG. 3 temporarily store data in the first to fifth stages, although not shown.

For example, the pipeline processor 10 includes an address calculating unit 56 which performs instruction fetch. The instruction cache 18 outputs an instruction based on the result of address calculation, and an instruction decoder 57 connected to the instruction cache 18 decodes the instruction delivered from the instruction cache 18.

The pipeline processor 10 also includes an arithmetic unit 59 which is connected to the instruction decoder 57 so as to carry out the decoded instruction, and the data cache memory 60 which is connected to the arithmetic unit 59 so as to store the result of execution of the decoded instruction, and whose memory access time is set to a value n times the execution cycle time of the arithmetic unit 59 (where n denotes an integer and is equal to, for example, 1).

The pipeline processor 10 further includes the general-purpose register 19 which is connected to the arithmetic unit 59 so as to store the result of execution as a register file, and a bypass control unit 58 which is disposed between an output of the general-purpose register 19 and an input of the arithmetic unit 59 so as to supply the result of execution to the arithmetic unit 59.

The address calculating unit 56 selects one of a plurality of instructions stored in the instruction cache 18 in accordance with address data entered from an external device, and delivers the selected instruction to the instruction decoder 57. For example, the instruction cache 18 can store a repeatedly executed instruction so that the address calculating unit 56 can perform higher-speed instruction fetching than an external memory.

The address calculating unit 56 can be also connected to the instruction decoder 57 so as to pass the result of address calculation to the instruction decoder 57. This is effective at processing an instruction which causes a great change in a program pointer, such as a branch instruction or a jump instruction.

The instruction decoder 57 may pass the decoded instruction directly to the arithmetic unit 59, or may pass the decoded instruction indirectly to the arithmetic unit 59 via the bypass control unit 58.

For memory access, the arithmetic unit 59 operates in the following manner. In the fourth stage, the arithmetic unit 59 allows the data cache memory 60 to store the result of instruction execution. In the fifth stage, the arithmetic unit 59 writes back data read from the data cache memory 60 to the general-purpose register 19.

The data cache memory 60 is configured so that the arithmetic unit 59 can access the memory 60 in one machine clock and data from the memory 60 can be written back to the general-purpose register 19 in one machine clock.

To use the result of instruction execution for next pipelining, the arithmetic unit 59 can operate in the following manner. In the fourth stage, the arithmetic unit 59 writes the result of execution into the bypass control unit 58, and receives data via the bypass control unit 58.

The arithmetic unit 59 can also operate in the following manner. In the fourth stage, the arithmetic unit 59 writes the result of execution into the bypass control unit 58, and receives data via the bypass control unit 58. Also in the fifth stage, the arithmetic unit 59 writes the result of execution into the bypass control unit 58, and receives data via the bypass control unit 58.

In the fifth stage, the arithmetic unit 59 can also write the result of execution into the general-purpose register 19. When the instruction decoder 57 decodes an instruction to write the result of execution, the register file into which the result of execution is to be written is delivered, and is selected in accordance with a register address signal transmitted through the pipeline.

The bypass control unit 58 receives immediate data delivered by the instruction decoder 57 and data delivered by the general-purpose register 19 in the second stage, and outputs the immediate data and the data to the arithmetic unit 59 in a predetermined execution stage.

THIRD EMBODIMENT

Figure 5:
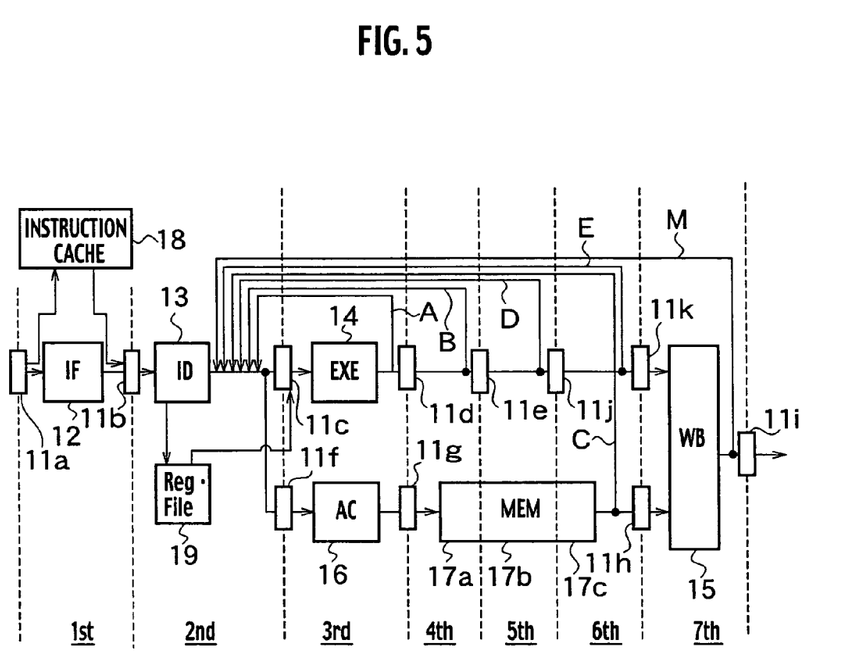
FIG. 5 is a view showing execution stages of a pipeline processor according to a third embodiment of the invention.

FIG. 5 is a diagram showing execution stages of a pipeline processor according to a third embodiment of the invention. Omitted is the repeated description of the same components of the execution stages of the third embodiment shown in FIG. 5 as the components of the execution stages of the second embodiment.

The execution stages of the pipeline processor of the third embodiment is different in configuration from the execution stages of the pipeline processor of the second embodiment, in that the execution stages of the pipeline processor of the third embodiment has a total of seven stages so that the pipeline configuration executes an instruction.

The pipeline processor organized based on the Pn value "3" written in the configuration storage unit 47 (see FIG. 1) constitutes a memory access stage including three memory accesses 17a, 17b, and 17c.

The pipeline configuration of the third embodiment has the same advantage as the pipeline configuration of the second embodiment. More specifically, the pipeline configuration allows the following pipelining to use the intermediate results (A, B, C, D, E, and M) of the third, fourth, fifth, sixth and seventh execution stages, and thus fails to cause an increase in pipeline stall (i.e., insertion of NOP).

Moreover, since the memory access stage is divided into the three memory accesses 17a, 17b, and 17c, the pipeline processor of the third embodiment can perform memory access in increments of one short execution cycle and thus speed up the overall pipelining, as compared to a pipeline processor which performs large-capacity memory access in one execution cycle.

Moreover, a multiple access system can be adopted. More specifically, the memory access 17a starts the reading of data by accessing an internal memory. After a lapse of a signal transmission time, the memory access 17b starts, at the start thereof, the reading of data at other addresses in the internal memory in accordance with the following pipeline instruction. At the end of the memory access 17b, the memory access 17b obtains the data read by the memory access 17a.

In this case, the access and the reading of data do not, of course, collide with each other on an internal bus, because data in the internal memory is delivered after a lapse of the signal transmission time. When access locations in the internal memory are physically distant from one another in a memory map, data retention can be prevented.

Although the multiple access system has been described by taking the internal memory as an example, the invention is not limited to this configuration. The multiple access system can be adopted, for example even when the internal memory and the cache memory are accessed in the same memory access stage.

Figure 6:
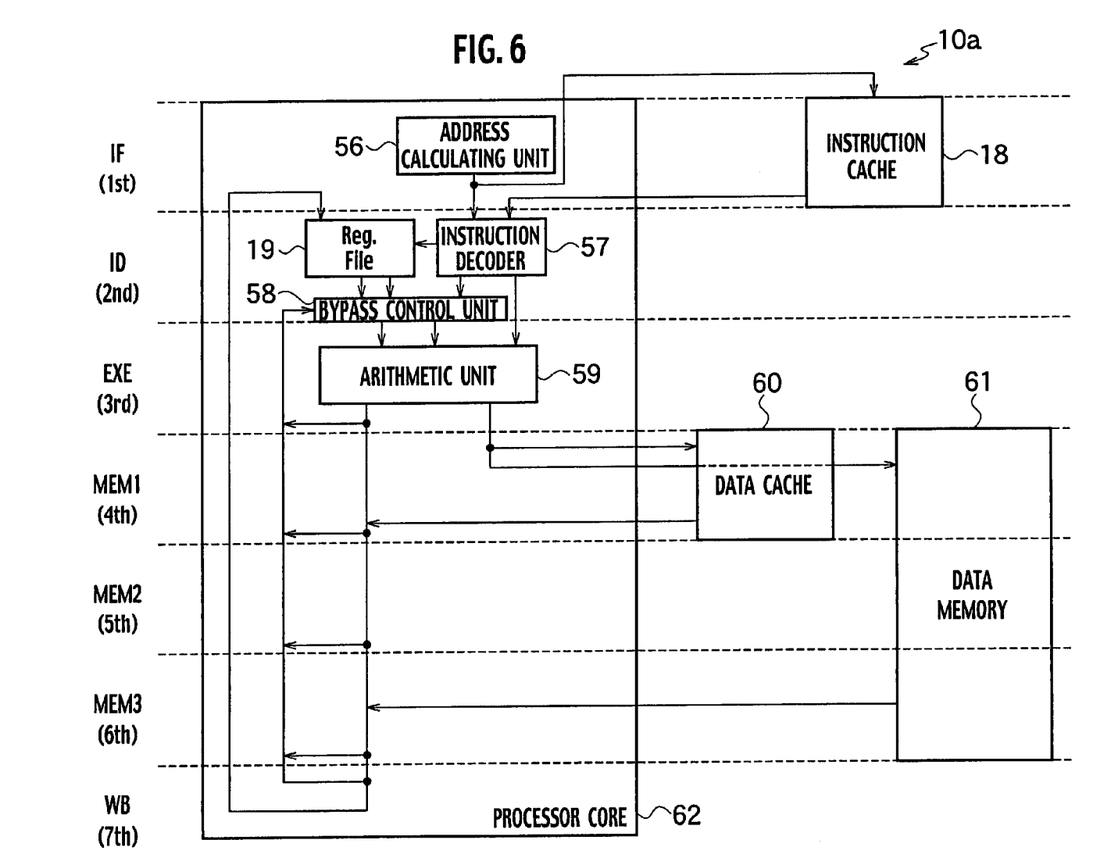
FIG. 6 is a schematic view showing the pipeline processor according to the third embodiment of the invention.

FIG. 6 is a diagram of the pipeline processor according to the third embodiment of the invention. A pipeline processor 10a includes the processor core 62, the instruction cache 18, the data cache memory 60, and a data memory 61. The pipeline processor 10a has the pipeline configuration including a total of seven stages so that the pipeline configuration executes an instruction.

The pipeline processor 10a of the third embodiment is different from the pipeline processor of the second embodiment, in that the pipeline processor 10a includes the data memory 61. Omitted is the repeated description of the same structural components of the third embodiment as the structural components of the second embodiment.

Incidentally, it is needless to say that the registers for use in registering of the stages described with reference to FIG. 5 temporarily store data in the first to seventh execution stages, although not shown.

The pipeline processor 10a allows the data cache memory 60 and the data memory 61 to store the result of operation delivered by the arithmetic unit 59. The data cache memory 60 carries out memory access in the execution stage in one machine clock, as in the case of the second embodiment.

The data memory 61 can receive write of the result of execution concurrently with the data cache memory 60. However, the data memory 61 is different from the data cache memory 60, in that a cycle of reading of data stored in the memory 61 is longer over, for example, three execution stages (i.e., the fourth, fifth and sixth stages).

The data memory 61 is manufactured in accordance with configuration information. The data memory 61 is connected to the arithmetic unit 59 so as to store the result of execution of a decoded instruction, and the memory access time of the data memory 61 is set to a value n times the execution cycle time of the arithmetic unit 59 (where n denotes an integer and is equal to, for example, 3).

When the bypass control unit 58 requests data in the data memory 61 in the sixth stage, the pipeline processor 10a performs control in the following manner. In the fourth stage, the read cycle of the data memory 61 is started. In the sixth stage after the fifth stage, data is read from the data memory 61, and the data is written into the bypass control unit 58.

When the general-purpose register 19 requests data in the data memory 61 in the seventh stage, the pipeline processor 10*a* can also carry out control in the following manner. In the fourth stage, the read cycle of the data memory 61 is started. In the sixth stage after the fifth execution stage, data is read from the data memory 61, and the data is retained in the register. In the seventh execution stage, the data is then written into the general-purpose register 19.

The pipeline processor 10*a* includes an address calculating unit 56 which performs instruction fetch, an instruction cache 18, an instruction decoder 57 connected to the instruction cache 18 decodes the instruction delivered from the instruction cache 18, an arithmetic unit 59 which is connected to the instruction decoder 57 so as to carry out the decoded instruction, a data memory 61 which is connected to the arithmetic unit 59 so as to store the result of execution of the decoded instruction, and whose memory access time is set to a value n times the execution cycle time of the arithmetic unit 59, a general-purpose register 19 which is connected to the arithmetic unit 59 so as to store the result of execution, and a bypass control unit 58 which is disposed between an output of the general-purpose register 19 and an input of the arithmetic unit 59 so as to supply the result of execution to the arithmetic unit 59.

The bypass control unit 58 delivers the result of execution to the following pipelining in the execution cycle time when the accessed data is output from the data memory 61. The arithmetic unit 59 includes the access path to the data memory 61 and the access path to a data cache 60. The data memory 61 is accessed in parallel with the data 60 simultaneously, and delivers data after a plurality of the execution cycles.

FOURTH EMBODIMENT

Figure 7:
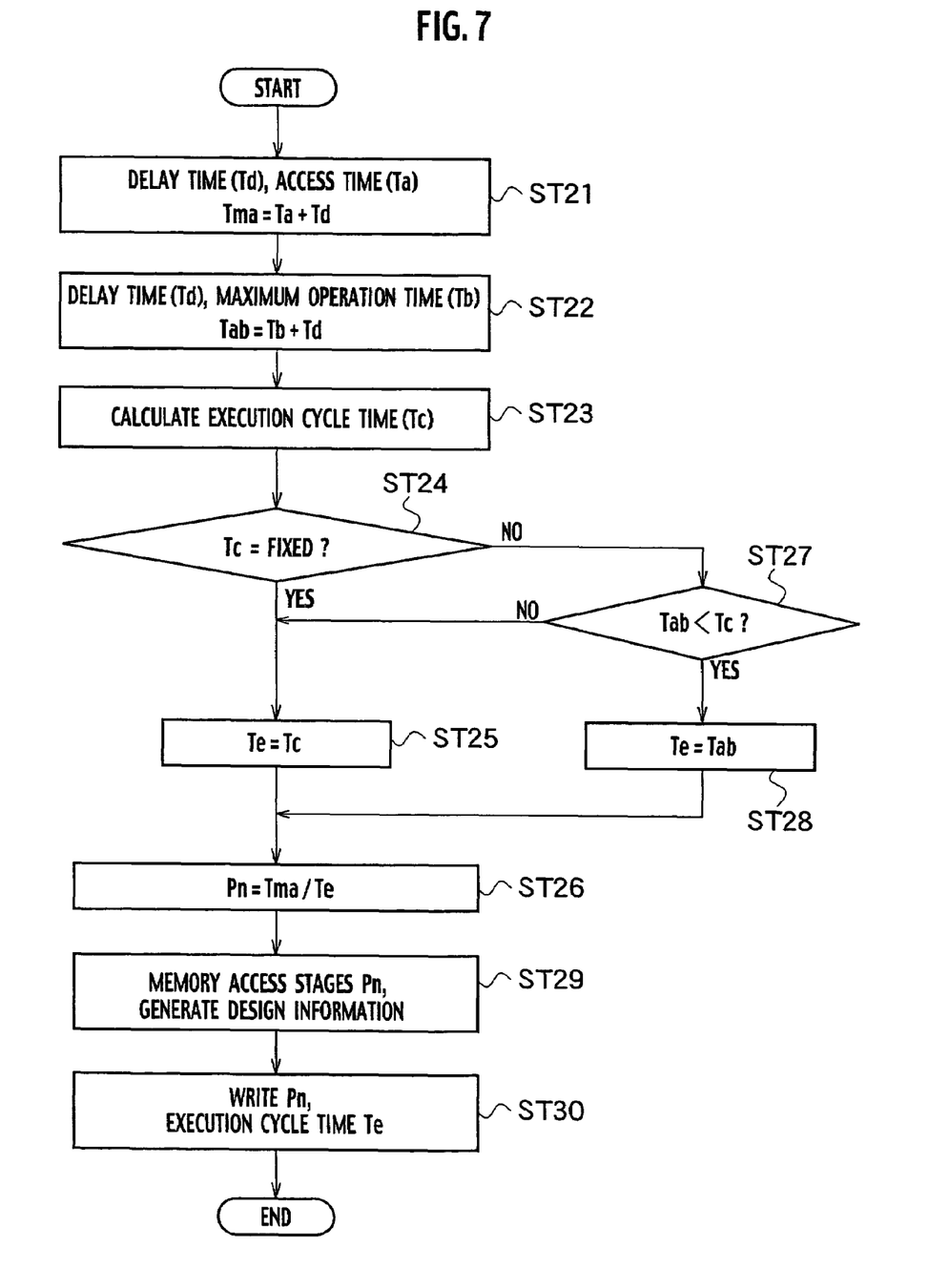
FIG. 7 is a flowchart explaining a method of organizing a processor according to a fourth embodiment of the invention.

FIG. 7 is a flowchart showing the method of organizing a pipeline processor according to a fourth embodiment of the invention. The description is given with regard to the method of organizing a pipeline processor with reference to the diagram of FIG. 1 and the flowchart of FIG. 7.

When a user enters and specifies a different configuration from prepared combinations of configurations through the input unit 50, the flow of the method organizing the pipeline processor, which is to take place at this time, goes to the step ST21 of FIG. 7.

In the step ST21, User-specified internal memory size information, which the user enters through the input unit 50, is stored in the configuration storage unit 47 via the interface 49 and the controller 48. The access time calculator 42 reads memory configuration information stored in the configuration storage unit 47 in accordance with the internal memory size information, and calculates the access time Ta of the internal memory. The generator 43 uses an equation shown in the step ST21 to add the delay time Td to the access time Ta of the internal memory. As employed herein, the delay time Td refers to the sum of the setup time and output delay time required for a pipeline stage. The resulting value is retained in the configuration storage unit 47 as a variable Tma.

Then, the processing goes to the step ST22. In the step ST22, the execution cycle calculator 41 calculates the maximum operation time Tb of the arithmetic circuit, which is required to carry out instructions including an option instruction. The generator 43 uses an equation shown in the step ST22 to add the delay time Td to the maximum operation time Tb. As employed herein, the delay time Td refers to the sum total of the setup time and output delay time required for the pipeline stage. The resultant value is retained in the configuration storage unit 47 as a variable Tab.

In the step ST23, the execution cycle calculator 41 calculates the execution cycle time Tc of the processor which is specified by configuration information which specifies the configuration of the configurable processor Pa. The processor organizing apparatus 40 places the calculation of the variable Tma and Tab values as the step of selecting candidates for the processor configuration. Thus, the generator 43 generates the simulator, and simulates the system LSI by using numeric values prestored in the configuration storage unit 47. When an intermediate value between the values stored in the configuration storage unit 47 or a value outside the range of the stored values is specified, the processor organizing apparatus 40 can also obtain the result of simulation by using a simple equation programmed into the generator 43, and can thus maintain excellent response characteristics of the system LSI.

Then, the processor organizing apparatus 40 determines a reference clock cycle time Te of the pipeline processor through the following steps.

When the generator 43 determines that the user specifies a system clock which is fixed by an external circuit or system which operates in conjunction with the pipeline processor (Yes in the step ST24), the processing goes to the step ST25. In the step ST25, the generator 43 selects the execution cycle time Tc of the pipeline processor as the reference clock cycle time Te, and the configuration storage unit 47 retains the selected execution cycle time Tc.

When the generator 43 determines that the system cycle is not limited (No in the step ST24), the processing goes to the step ST27. In the step ST27, the execution cycle time Tc value is compared to the variable Tab value. When the variable Tab value is less than the execution cycle time Tc value (Yes in the step ST27), the processing goes to the step ST28. In the step ST28, the variable Tab value is selected as the reference clock cycle time Te, and the selected variable Tab value is retained in the configuration storage unit 47.

When the execution cycle time Tc value is less than the variable Tab value (No in the step ST27), the processing goes to the step ST25. In the step ST25, the generator 43 sets the execution cycle time Tc of the processor stored in the configuration storage unit 47 to the reference clock cycle time Te.

In the step ST26, the generator 43 then divides the time Tma by the reference clock cycle time Te. As employed herein, the time Tma refers to the sum of the access time Ta of the memory and the delay time Td preset by a design system. Then, the Pn value is retained in the configuration storage unit 47. As employed herein, the Pn value refers to an integer which is determined by rounding up the result of division, that is, by raising decimals to the next whole number.

In other words, when the memory access time is longer than one execution cycle time of the pipeline processor, the generator 43 can reset the memory access time to a value n times the execution cycle time of the pipeline processor (where n denotes an integer), and the generator 43 can cause the configuration storage unit 47 to retain the memory access time of the internal memory.

The generator 43 generates the design information on the processor including the pipeline control circuit and the bypass circuit which operate at a reference clock cycle of Pn memory access stages, and outputs the design information to the output unit 51 (see FIG. 1) (in the step ST29). Moreover, the generator 43 sets the number of pipeline stages of the memory access stage to Pn, and writes the Pn value, that is, the configuration information, into the configuration storage unit 47 (in the step ST30).

FIFTH EMBODIMENT

Figure 8:
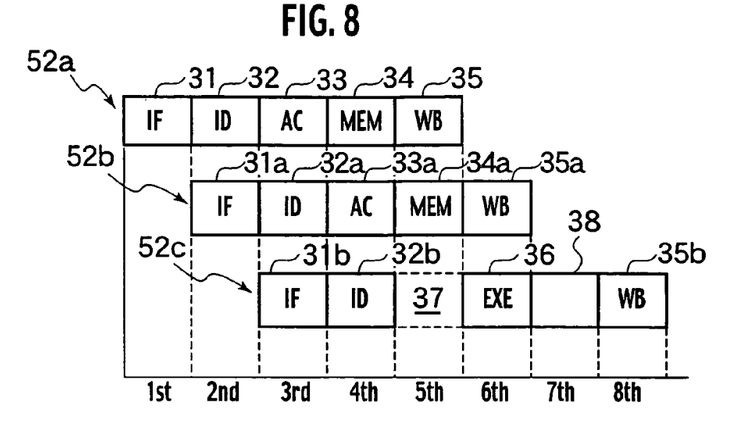
FIG. 8 is a timing chart of a pipeline processor according to a fifth embodiment of the invention.

FIG. 8 is a timing chart of a pipeline processor according to a fifth embodiment of the invention.

When the stages of internal memory access and cache memory access are each one cycle, the execution of three types of instructions, that is, an internal memory access instruction 52a (i.e., a load word instruction) "LW $10, ($1)", a cache memory access instruction 52b (i.e., a load word instruction) "LW $11, ($2)", and an add instruction 52c (i.e., add) "ADD $10, $11", ends in a total of 8 cycles, as shown in FIG. 8.

The internal memory access instruction 52a is the instruction to retain internal memory data specified by a register "1" in a register "10". The cache memory access instruction 52b is the instruction to retain cache memory data specified by a register "2" in a register "11". The add instruction 52c is the instruction to add data of the register "10" to data of the register "11" and retain the result of the addition in the register "10". The invention is not limited to these three types of instructions. It goes without saying that many instructions of the pipeline processor can be executed.

As shown in FIG. 8, the execution of the internal memory access instruction 52a "LW $10, ($1)" is accomplished through 5-stage pipelining including fetching (IF) 31, instruction decoding (ID) 32, address calculation (AC) 33, memory access (MEM) 34, and register write back (WB) 35. The execution of the cache memory access instruction 52b "LW $11, ($2)" is accomplished through 5-stage pipelining including fetching (IF) 31a, instruction decoding (ID) 32a, address calculation (AC) 33a, memory access (MEM) 34a, and register write back (WB) 35a, starting at the second stage of the pipeline. The execution of the add instruction 52c "ADD $10, $11" is accomplished through 6-stage pipelining including fetching (IF) 31b, instruction decoding (ID) 32b, stall 37, instruction execution (EXE) 36, next-cycle process 38, and register write back (WB) 35b, starting at the third stage of the pipeline.

SIXTH EMBODIMENT

Figure 9:
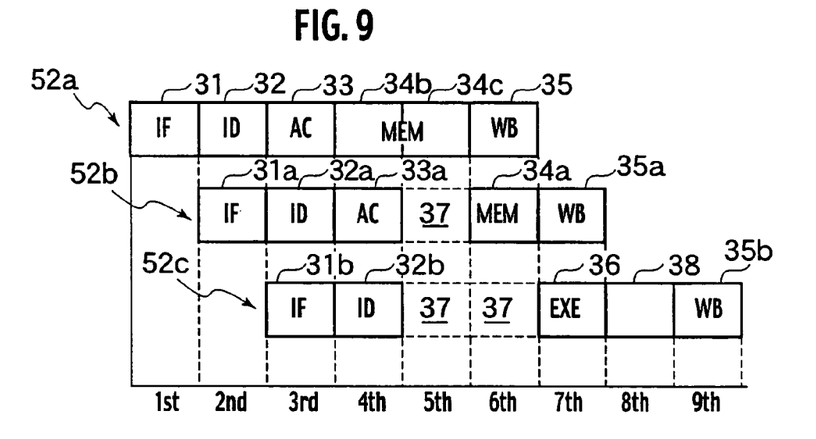
FIG. 9 is a timing chart of a pipeline processor according to a sixth embodiment of the invention.

FIG. 9 is a timing chart of a pipeline processor according to a sixth embodiment of the invention. Omitted is the repeated description of the same structural components of the sixth embodiment as the structural components of the above-mentioned fifth embodiment. The sixth embodiment is different from the fifth embodiment in that the internal memory access of the sixth embodiment is configured to be division access in two cycles.

As shown in FIG. 9, the execution of three instructions, that is, the internal memory access instruction 52a "LW $10, ($1)", the cache memory access instruction 52b "LW $11, ($2)", and the add instruction 52c "ADD $10, $11", ends in a total of 9 cycles. The execution of the internal memory access instruction 52a "LW $10, ($1)" is accomplished through 6-stage pipelining including memory access (MEM) 34b and 34c starting at the fourth execution stage, and the register write back (WB) 35. The execution of the cache memory access instruction 52b "LW $11, ($2)" is accomplished through 6-stage pipelining including the memory access (MEM) 34a executed in the sixth execution stage of the pipeline, and the register write back (WB) 35a. Although the memory access 34a takes place concurrently with the register write back 35 of the internal memory access instruction 52a, stall such as an NOP instruction is inserted into the add instruction 52c in the sixth execution stage. The execution of the add instruction 52c "ADD $10, $11" is accomplished through 7-stage pipelining including the fetching (IF) 31b, the instruction decoding (ID) 32b, the stall 37, the stall 37, the instruction execution (EXE) 36, the next-cycle process 38, and the register write back (WB) 35b, starting at the third execution stage of the pipeline.

SEVENTH EMBODIMENT

Figure 10:
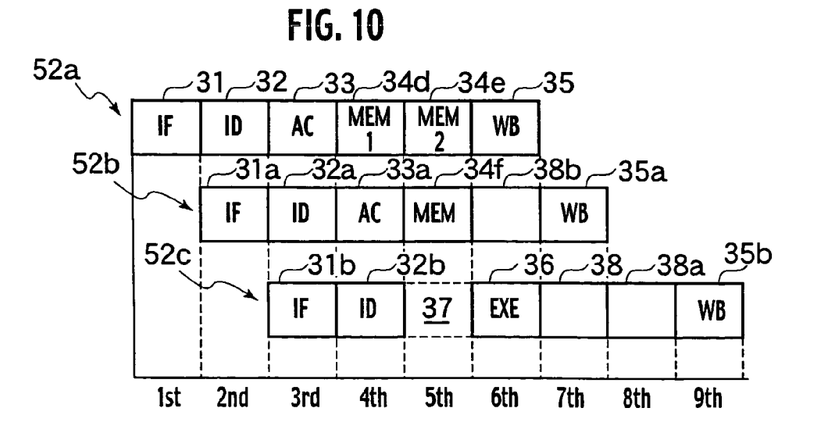
FIG. 10 is a timing chart of a pipeline processor according to a seventh embodiment of the invention.

FIG. 10 is a timing chart of a pipeline processor according to a seventh embodiment of the invention. Omitted is the repeated description of the same structural components of the seventh embodiment as the structural components of the above-mentioned fifth and sixth embodiments. The seventh embodiment is different from the fifth and sixth embodiments in that the internal memory access stage of the seventh embodiment is configured to be division access in two independent stages.

As shown in FIG. 10, the execution of three instructions, that is, the internal memory access instruction 52a "LW $10, ($1)", the cache memory access instruction 52b "LW $11, ($2)", and the add instruction 52c "ADD $10, $11", ends in a total of 9 cycles. The execution of the internal memory access instruction 52a "LW $10, ($1)" is accomplished through 6-stage pipelining including memory access (MEM) 34d executed in the fourth execution stage, memory access (MEM) 34e executed in the fifth execution stage, and the register write back (WB) 35 executed in the sixth execution stage. The execution of the cache memory access instruction 52b "LW $11, ($2)" is accomplished through 6-stage pipelining including memory access (MEM) 34f executed in the fifth execution stage of the pipeline, a next-cycle process executed in the sixth execution stage, and the register write back (WB) 35a executed in the seventh execution stage. Although the memory access (MEM) 34f takes place concurrently with the memory access (MEM) 34e of the internal memory access instruction 52a, stall is inserted into the add instruction 52c in the fifth execution stage. The execution of the add instruction 52c "ADD $10, $11" is accomplished through 7-stage pipelining including the fetching (IF) 31b, the instruction decoding (ID) 32b, the stall 37, the instruction execution (EXE) 36, the next-cycle process 38, a next-cycle process 38b, and the register write back (WB) 35b, starting at the third execution stage of the pipeline.

In the seventh embodiment, the memory access (MEM) 34f is executed in the fifth execution stage of the cache memory access instruction 52b "LW $11, ($2)". Thus, the seventh embodiment can advance the execution of cache memory data access by one execution cycle, as compared to the sixth embodiment. Therefore, the seventh embodiment has the advantage of enabling the following instruction process to use cache memory data.

In the seventh embodiment, the instruction execution (EXE) 36 is processed in the sixth execution stage. Thus, the seventh embodiment can advance the use of the result of instruction execution by one execution cycle, as compared to the sixth embodiment. Therefore, the seventh embodiment also has the advantage of enabling the following instruction process to use the result of instruction execution.

When a cache hit occurs in the cache memory access stage, the generator 43 (see FIG. 1) performs processing in one execution cycle. Thus, when Pn is equal to or more than 2, the generator 43 sets the number of pipeline stages of the memory access stage to Pn in a configuration file, and writes the Pn value, that is, memory access division information, into the configuration storage unit 47 (see FIG. 1).

Moreover, the generator 43 generates design information on the processor including the pipeline control circuit and the bypass circuit which enable independent and concurrent operation of two types of execution stages, e.g., memory cells MA1 and MA2, into which the internal memory access stage is divided. Additionally, the generator 43 generates design information on the pipeline processor including a first access path to the internal memory of the pipeline processor and a second access path to the cache memory thereof, which is separated from each other. The generator 43 delivers the design information to the output unit 51, and simultaneously writes the design information into the configuration storage unit 47.

In the seventh embodiment, the internal memory and the cache memory are concurrently accessed. However, the invention is not limited to this configuration. For example, it goes without saying that one part of the internal memory and the other part of the internal memory may be concurrently accessed, as in the case of the third embodiment shown in FIG. 5.

In this case, the signal transmission time of the internal memory can be used so that one part executes access to the memory cell and the other part executes data output from the memory cell.

According to the processor organizing apparatus 40 configured as described above, the user who designs the system LSI by writing the program in C language can evaluate the performance of the system LSI for all combinations of configurable structural components of the processor.

When the performance of the system LSI fails to satisfy initially desired specifications, the processor organizing apparatus 40 can carry out performance evaluation of the system LSI with accuracy and ease, when the internal memory capacity is increased so that the effective memory access speed is improved, before the start of design using functional partitioning of software and hardware requiring information and knowledge about hardware of a circuit to be implemented in hardware, or the like. Thus, the processor organizing apparatus 40 can reduce the time required for design and organization.

Various modifications will become possible for those skilled in the art after receiving the teachings of the present disclosure without departing from the scope thereof.

What is claimed is:

1. An apparatus for organizing a processor, comprising:
   an execution cycle calculator configured to calculate an execution cycle time of a pipeline processor;
   an access time calculator configured to calculate a memory access time of an internal memory contained in the pipeline processor;
   a configuration storage unit configured to store an integer value determined by dividing the memory access time of the internal memory by the execution cycle time of the pipeline processor and raising decimals to next whole number;
   a generator configured to generate design information on the processor including a pipeline control circuit of which a number of memory access stages is the integer value; and
   an output unit configured to display the design information.

2. The apparatus of claim 1, wherein the generator selects a shorter one of the execution cycle time and a time added to a delay time, the delay time referring to sum total of a setup time and output delay time required for pipeline stages of the pipeline processor, in a maximum operation time and calculates a number of the pipeline stages of the memory access stage based on the shorter one.

3. The apparatus of claim 1, wherein the execution cycle calculator calculates the execution cycle time based on configuration information of a cache memory and an arithmetic circuit, the configuration information being stored in the configuration storage unit.

4. The apparatus of claim 1, further comprising an evaluator configured to evaluate performance of an application to be carried out on the pipeline processor.

5. The apparatus of claim 1, wherein the access time calculator calculates the memory access time based on a memory capacity of the internal memory stored in the configuration storage unit.

6. The apparatus of claim 1, wherein the configuration storage unit stores memory access division information related to the number of steps needed to access the internal memory.

7. The apparatus of claim 1, wherein the configuration storage unit stores design information on the pipeline processor including a first access path to the internal memory and a second access path to a cache memory, and the second access path is separated from the first access path.

8. The apparatus of claim 1, wherein the configuration storage unit stores design information in which the internal memory and a cache memory are accessed simultaneously.

9. A computer implemented method for organizing a processor, comprising:
   calculating an execution cycle time of a pipeline processor;
   calculating a memory access time of an internal memory contained in the pipeline processor;
   storing an integer value determined by dividing the memory access time of the internal memory by the execution cycle time of the pipeline processor and raising decimals to next whole number; and
   generating design information on the processor including a pipeline control circuit of which a number of memory access stages is the integer value.

10. The method of claim 9, further comprising:
    selecting a shorter one of the execution cycle time and a time added to a delay time, the delay time referring to sum total of a setup time and output delay time required for pipeline stages of the pipeline processor, in a maximum operation time; and
    calculating a number of the pipeline stages of a memory access stage based on the shorter one.

11. The method of claim 9, wherein the execution cycle time is calculated based on configuration information of a cache memory and an arithmetic circuit, the configuration information being stored in the configuration storage unit.

12. The method of claim 9, further comprising evaluating performance of an application carried out on the pipeline processor.

13. The method of claim 9, wherein the memory access time is calculated based on a memory capacity of the internal memory stored in the configuration storage unit.

14. The method of claim 9, further comprising storing memory access division information related to the number of steps needed to access the internal memory in the configuration storage unit.

15. The method of claim 9, further comprising storing design information on the pipeline processor including a first access path to the internal memory and a second access path to a cache memory in the configuration storage unit, wherein the second access path is separated from the first access path.

16. The method of claim 9, further comprising storing design information, in which the internal memory and a cache memory are accessed simultaneously, in the configuration storage unit.

* * * * *